US007921440B1

(12) United States Patent
Kolde et al.

(10) Patent No.: US 7,921,440 B1
(45) Date of Patent: Apr. 5, 2011

(54) METHOD AND SYSTEM FOR MANAGING TELEVISION VIEWING HABITS

(75) Inventors: Hubert E. Kolde, Mercer Island, WA (US); Tobin E. Farrand, Los Altos Hills, CA (US); Steven J. Young, Los Gatos, CA (US)

(73) Assignee: ARRIS Group, Inc., Suwanee, GA (US)

( * ) Notice: Subject to any disclaimer, the term of this patent is extended or adjusted under 35 U.S.C. 154(b) by 1806 days.

(21) Appl. No.: 10/334,687

(22) Filed: Dec. 30, 2002

(51) Int. Cl.
*H04N 7/16* (2006.01)
(52) U.S. Cl. .................. 725/28; 725/5; 725/29; 348/460
(58) Field of Classification Search .................. 725/1–8, 725/25–31; 348/5.5, 6, 460, 515, 906
See application file for complete search history.

(56) References Cited

U.S. PATENT DOCUMENTS

| 3,889,050 | A | * | 6/1975 | Thompson | 725/119 |
|---|---|---|---|---|---|
| 4,410,911 | A | * | 10/1983 | Field et al. | 380/238 |
| 4,528,589 | A | * | 7/1985 | Block et al. | 380/241 |
| 5,029,207 | A | * | 7/1991 | Gammie | 380/228 |
| 5,060,079 | A | | 10/1991 | Rufus-Isaacs | 358/349 |
| 5,168,372 | A | | 12/1992 | Sweetser | 358/349 |
| 5,382,983 | A | | 1/1995 | Kwoh et al. | 348/716 |
| 5,485,518 | A | | 1/1996 | Hunter et al. | 380/20 |
| 5,550,575 | A | | 8/1996 | West et al. | 348/5.5 |
| 5,583,576 | A | | 12/1996 | Perlman et al. | 348/460 |
| 5,675,647 | A | * | 10/1997 | Garneau et al. | 380/239 |
| 5,751,335 | A | | 5/1998 | Shintani | 348/5.5 |
| 5,828,402 | A | * | 10/1998 | Collings | 725/28 |
| 5,960,416 | A | * | 9/1999 | Block | 705/34 |
| 6,020,882 | A | * | 2/2000 | Kinghorn et al. | 715/716 |
| 6,115,057 | A | | 9/2000 | Kwoh et al. | 348/5.5 |
| 6,119,109 | A | * | 9/2000 | Muratani et al. | 705/400 |
| 6,208,805 | B1 | * | 3/2001 | Abecassis | 386/334 |
| 6,226,793 | B1 | | 5/2001 | Kwoh | 725/28 |
| 6,347,183 | B1 | | 2/2002 | Park | 386/94 |
| 6,363,364 | B1 | * | 3/2002 | Nel | 705/42 |
| 6,377,938 | B1 | * | 4/2002 | Block et al. | 705/32 |
| 6,396,531 | B1 | | 5/2002 | Gerszberg et al. | 348/14.01 |
| 6,530,082 | B1 | * | 3/2003 | Del Sesto et al. | 725/9 |
| 6,701,523 | B1 | * | 3/2004 | Hancock et al. | 725/25 |

(Continued)

*Primary Examiner* — Annan Q Shang
(74) *Attorney, Agent, or Firm* — Troy A. Van Aacken; Robert J. Starr

(57) ABSTRACT

Methods and systems for monitoring and budgeting television viewing in order to influence and manage television-viewing habits in a manner that promotes self-monitoring. Example embodiments provide a Content Viewer Control System ("CVCS"), which enables devices and systems connected to a head-end, such as through a standard set-top box or a media center, to track and potentially control differing aspects of television viewing according to a viewing budget. For example, the CVCS can allow tracking and control over what content is viewed according to a variety of criteria, during which time periods, and for what duration on an individual or on a per-location basis, and/or based upon other configurable parameters. In summary, the CVCS receives notification of content as potential viewing events, compares a potential viewing event to stored viewing budget "allocations," and reconciles the potential viewing event against the viewing budget. In one example embodiment, the CVCS comprises an interface to the content display and control components, a viewing event tracker component, and a viewing event reconciler engine. The viewing event tracker receives notification of content to be viewed (a potential viewing event), extracts pertinent information, and forwards the extracted information to the viewing event reconciler engine. The viewing event reconciler engine reconciles the forwarded information against budget data and/or rules and sends content control instructions to the interface. The CVCS optionally contains a data repository with the viewing budget or interfaces to an external data repository.

70 Claims, 9 Drawing Sheets

U.S. PATENT DOCUMENTS

| | | | |
|---|---|---|---|
| 6,922,843 B1 * | 7/2005 | Herrington et al. | 725/30 |
| 7,092,006 B2 * | 8/2006 | Walker et al. | 348/143 |
| 7,200,852 B1 * | 4/2007 | Block | 725/28 |
| 2002/0029384 A1 * | 3/2002 | Griggs | 725/46 |
| 2002/0078441 A1 | 6/2002 | Drake et al. | 725/9 |
| 2002/0144279 A1 * | 10/2002 | Zhou | 725/95 |

* cited by examiner

| | $D_1$ | $D_2$ | $D_3$ | $D_4$ | $D_5$ | ... | $D_m$ |
|---|---|---|---|---|---|---|---|
| | Loc ID | User ID | Time Allotment Condition | Content Classifier/Value$_1$ | Content Classifier/Value$_2$ | | Content Classifier/Value$_n$ |
| $R_1$ | Living Room | * (all) | Only > 20:00 hr and < 22:00 hr | genre = NOT action | rating = G or PG | | |
| $R_2$ | Living Room | not (user1, user2, user3) | Only ≥ 22:00 hr | | | | |
| $R_3$ | Bedroom 1 | * | 1 hr = 2 hr used | genre = cartoon | | | |
| $R_4$ | Bedroom 1 | * | 1 hr = .5 hr used | genre = science OR education | | | |
| $R_5$ | Bedroom 1 | * | Total = 10hrs per week | | | | |
| ... | | | | | | | |
| $R_n$ | Bedroom 1 | * | 1 hr = .25 hr used | genre = science | actor = Bill Nye | | |

Content Viewing Budget

*FIG. 3*

METHOD AND SYSTEM FOR MANAGING TELEVISION VIEWING HABITS

BACKGROUND OF THE INVENTION

1. Field of the Invention

The present disclosure relates generally to tracking and controlling television viewing and, in particular but not exclusively, to methods and systems for managing viewing activity for multiple television viewers in a multi-tuner, multi-television environment.

2. Background Information

Lack of control of television viewing, in terms of both the amount of hours spent in front of televisions ("TVs") and the inappropriateness of content being viewed is an ever-increasing concern for some in today's communities, especially parents and educators. For example, it has been alleged that serious diseases, such as diabetes and obesity, are on the rise partially due to increased numbers of persons spending more time stagnant in front of TVs, computers, and other electronic equipment. In addition, as with most children's activities, parents and educators often strive to create a balance in the types of activities in which their children participate. However, our modern society often demands more employment dedicated time from one or both adults in a household; thus, the availability of adults to supervise their children's viewing of television programs, playing computer games, etc. is potentially decreased.

Different approaches have been offered to address these concerns. These approaches generally fall into two distinct classes with respect to television watching: content restricted access and time limited viewing. Content restriction generally involves a device or software attached to the television that can be programmed to prohibit the viewing of particular content on a particular television. For such a system to operate properly, the person programming the device typically needs to know and be able to describe in advance the particular content to be blocked. However, such a priori knowledge is not always possible or convenient to obtain. In addition, such systems typically operate relative to a particular device. Thus, it is difficult to use such systems in environments with differing or variable needs. For example, if several different viewers operate the same television, their respective viewing capabilities will be controlled by the most restricted individual, unless some kind of sophisticated identification scheme is employed by the system to recognize a particular individual. Different approaches have been suggested or used as identification tools such as: password identification, card keys, magnetic devices, and the like.

A second approach to addressing viewing concerns has been to limit or otherwise restrict the viewing time of individuals. When a person's viewing time has expired or s/he attempts to view the television during a blocked period, according to whatever measuring technique is being used, the television is typically disabled. Again, many of these solutions involve additional hardware and/or software associated with the television device and typically restrict watching on a per location basis (e.g., a particular TV) unless some kind of identification scheme is jointly used. Different measuring techniques have been described in the literature, including restricting by particular times of day (week/month, etc.) and by allocating different amounts of viewing time, such as "n" number of hours per time period (e.g., day/week/month, etc.).

With the advent of new and improved technologies such as set-top boxes and PVRs that allow digital recording and delayed playback of digital broadcasts, the same concerns become greater and the solutions even more complex. In these environments, delayed playback is potentially more difficult to monitor without adding sophisticated detection and control mechanisms to the devices that read the playback from the storage medium.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 3 is a block diagram of an example viewing budget.

DETAILED DESCRIPTION OF THE INVENTION

Embodiments of the present invention provide computer- and network-based methods and systems for monitoring and budgeting television viewing in order to influence and manage television-viewing habits in a manner that promotes self-monitoring. Example embodiments provide a Content Viewer Control System ("CVCS"), which enables devices and systems connected to a head-end, such as through a standard set-top box or a media center, to track and potentially control differing aspects of television viewing according to a viewing budget. Similar to a typical financial budget, a viewing budget is a data representation of allocations of viewing units, such as viewing time and/or viewing content, potentially based upon satisfying one or more conditions. For example, the CVCS allows viewers and administrators (such as a parent or teacher in a classroom) to configure what content is viewed according to a variety of criteria, during which time periods, and for what duration on an individual or on a per-location basis, and/or based upon other configurable parameters. In contrast to traditional approaches, the CVCS can configure content without knowledge of specific television broadcast programming information ahead of time and without forcing total restriction of certain types of content, for example, particular genres.

Figure 1:
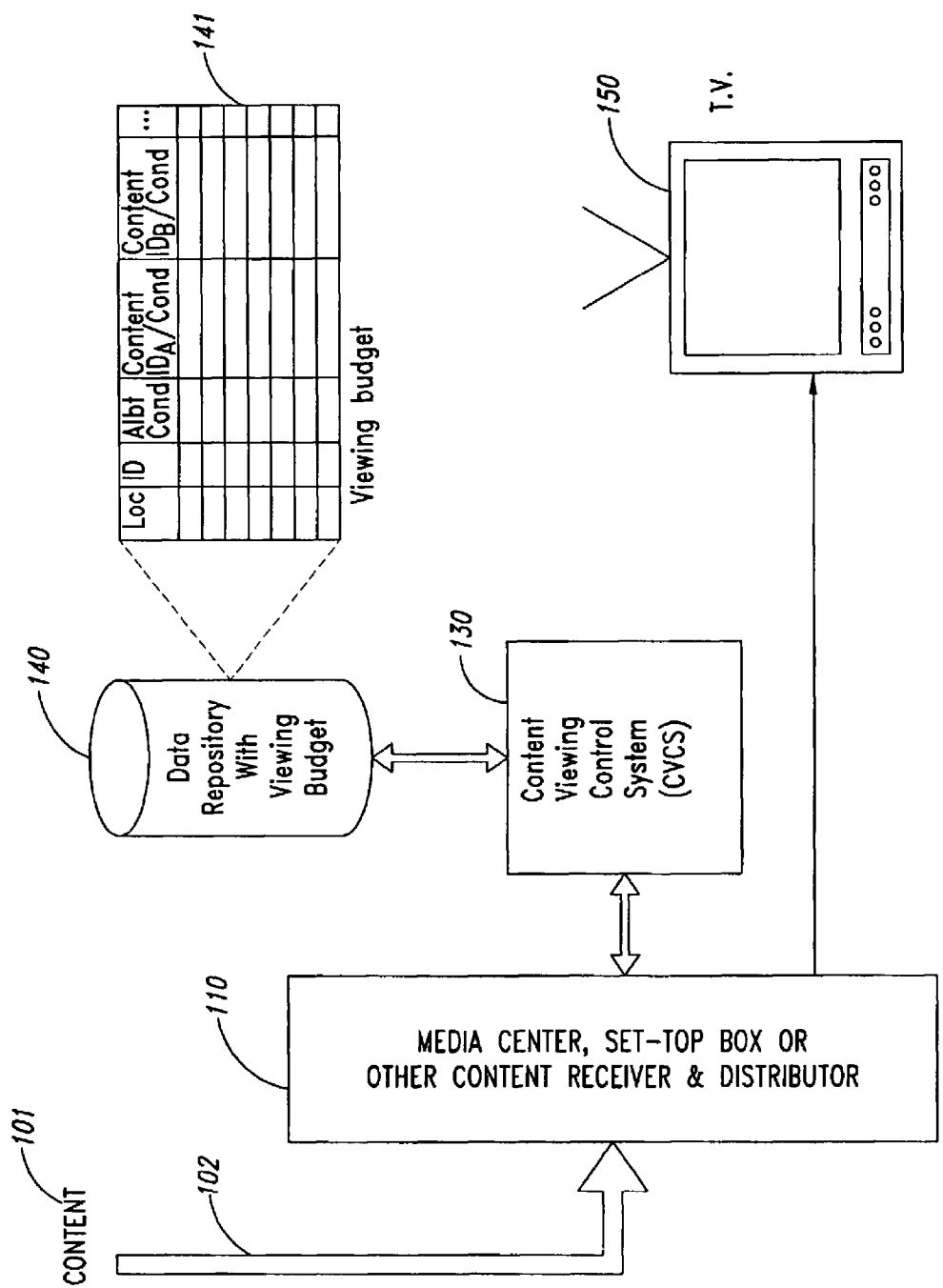
FIG. 1 is a block diagram of an example Content Viewer Control System used to manage viewing habits.

FIG. 1 is a block diagram of an example Content Viewer Control System used to manage content viewing habits. In FIG. 1, a content receiver and distribution mechanism, such as a media center or set-top box 110, receives television or other video content 101 through a content distribution network 102, such as a cable network. The media center or set-top box 110 distributes the received content 101 to the Content Viewer Control System (CVCS) 130, which controls the content viewing process by directing the media center or set-top box 110 in its display of the content on a television 150. As part of content viewing control, the CVCS 130 communicates with a data repository 140, which contains a representation of a viewing budget 141, to monitor and control the viewing of the content 101 in accordance with the viewing budget 141.

Example embodiments described herein provide applications, code, tools, data structures, and other support to implement a content viewer control system. Although the techniques used by a CVCS are generally applicable to any content viewable on a television (or other display) screen, the term "content" is used generally to imply any type of content that can be displayed and viewed electronically, including, but not limited to, text, graphics, audio, and video. Also, one skilled in the art will recognize that terms such as "television," "TV," "TV screen," etc., are used interchangeably to indicate any type of display device that is capable of operating with the CVCS, including devices other than television screens, such as computer monitors, screens on handheld or other portable devices, etc. In addition, terms may have alternate spellings which may or may not be explicitly mentioned, and one skilled in the art will recognize that all such variations of terms are intended to be included.

In addition, although the example embodiments described often refer to the monitoring and viewing of television content, one skilled in the art will recognize that other example embodiments of the methods and systems of the present invention may be used for many other purposes, including managing the viewing of or tracking other types of content streamed electronically, providing that meta information associated with characteristics of the content is dynamically retrievable. Thus, techniques of the present invention can also be used with pre-recorded digital streamed content having, for example, multiple streams, one of which contains metadata, such as streams delivered over a network like the Internet. For example, the methods and systems discussed herein are applicable to tracking the viewing of any type of interactive application content, for example, for use in generating "Nielsen" type rating data or other types of tracking or rating data. Thus, the CVCS may be used also as a Nielsen device. The tracking may also be instituted on devices other than televisions, such as personal computers, wireless devices, etc.

Also, in the following description, numerous specific details are set forth, such as data formats and code sequences, etc., in order to provide a thorough understanding of the techniques of the methods and systems of the present invention. One skilled in the art will recognize, however, that the present invention also can be practiced without one or more of the specific details described herein, or with other specific details, methods, components, operations, etc., such as changes with respect to the ordering of the code flow. Also, other steps could be implemented for each routine, and in different orders, and in different routines, yet still achieve the functions of the CVCS.

Figure 2:
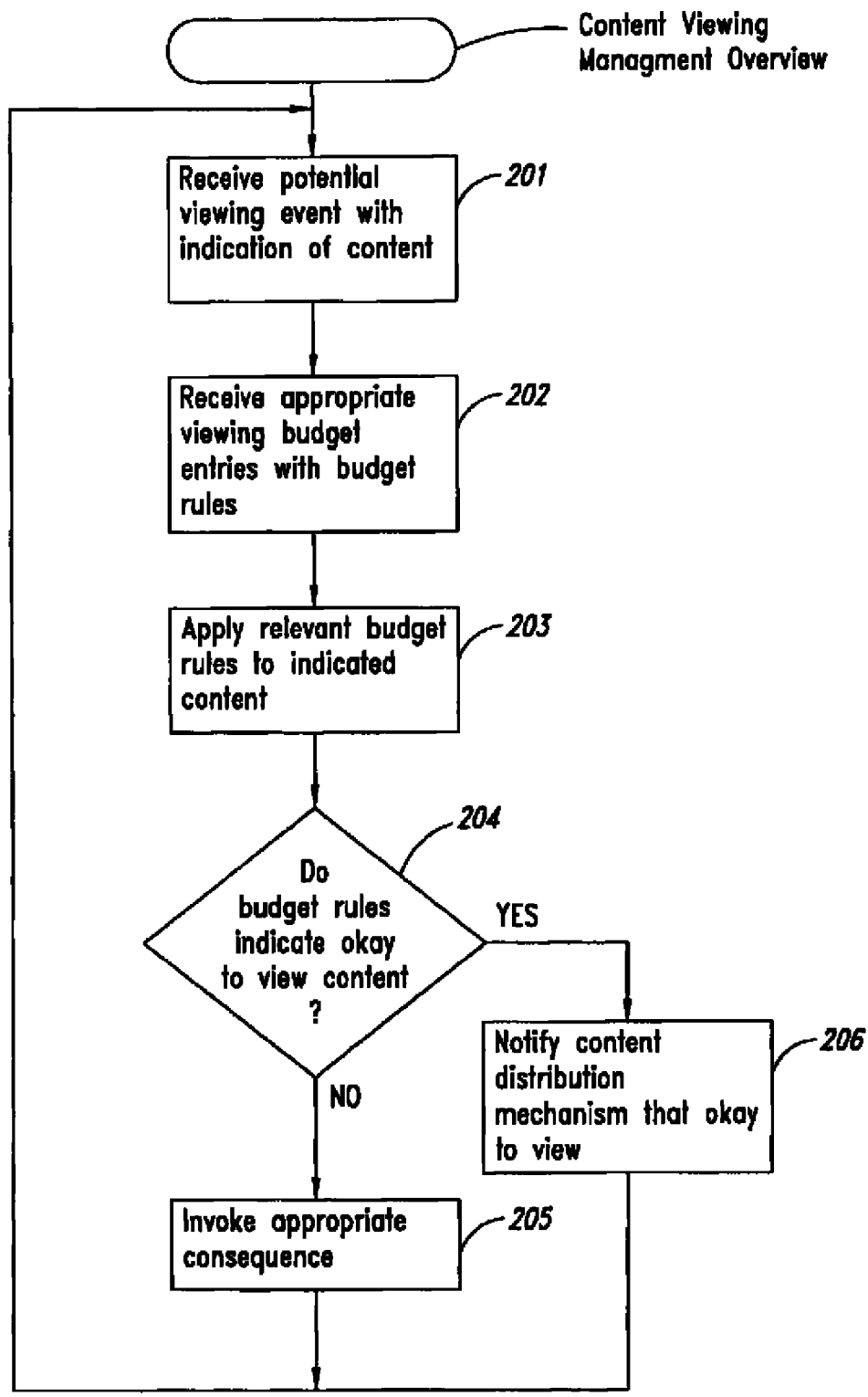
FIG. 2 is an example overview flow diagram of the process performed by the Content Viewer Control System to implement content viewing management.

FIG. 2 is an example overview flow diagram of the process performed by a Content Viewer Control System to implement content viewing management. In summary, the CVCS receives notification of content as potential viewing events, compares a potential viewing event to stored viewing budget "allocations," and reconciles the potential viewing event against the viewing budget. More specifically, in step 201, the CVCS receives a potential viewing event from the content receiver and distribution mechanism, e.g., media center or set-top box 110 in FIG. 1. In step 202, the CVCS retrieves appropriate viewing rules and/or configuration data from a viewing budget, such as data repository 140 containing viewing budget 141. In step 203, the CVCS applies the retrieved viewing rules or computes them as necessary, depending upon the particular representation of the viewing budget used, and, in step 204, determines whether the applicable viewing rules indicate that the budget allocation for the content of the received viewing event is "used up." When an applicable budget allocation is exceeded or the restrictive conditions specified in the budget are met, then, in step 205, the CVCS institutes an appropriate viewing "consequence," such as prohibiting the further display of content that meets the criteria, turning off the TV, etc. If the viewing event is still "within the budget" (including not restricted), then, in step 206, the distribution mechanism is appropriately notified to display the viewing event content. The process then returns to step 201 to wait for the next potential viewing event.

Using these techniques, a viewer can self-monitor relative to the viewer's corresponding budget allocations and thus can control outcome by choosing content wisely and staying within budget allocations. Thus, the configurability of the CVCS allows for greater flexibility and a finer degree of control over viewing than that offered by traditional approaches. Further, the CVCS encourages children and other viewers to learn and practice responsibility, accountability, and decision-making using real world approaches.

For example, a parent may wish to manage and encourage desired television viewing habits of each of the children in his or her household differently based upon age. In the case of the youngest children, the parent may wish to allow a lesser total amount of viewing, prohibit all content that is not age appropriate, and encourage the viewing of educational programs such as science-related programs by rewarding the children with bonus time for viewing these programs. Certain content can be prohibited based upon characteristics dynamically detectable from the content, such as genre or rating information available from an EPG, or such as encoded "meta" information such as what actors are in the film, subject information, or other similar characteristics associated with the content. The same parent may wish to allow certain other types of content for the teenagers in the household and implement a complex incentive based total time allotment scheme. For example, a more complex scheme might grant extra television viewing time progressively as more hours are spent viewing educational programs. In addition, the same scheme might specify that total time allotment is consumed more rapidly, and on a progressive basis, when the teenager views what the parents consider "time-wasters" such as, for example, cartoons. Once such a scheme is communicated to the CVCS as a viewing budget, the children can then self-monitor and control the rapidity of consumption of their viewing allotment (within the boundaries of the total time allotted) by making intelligent choices about what they watch and when. In addition, the parent is able to restrict the viewing of content dynamically, based upon detectable characteristics of the program content being viewed, without a priori knowledge of what content is scheduled to be broadcasted.

Although discussed herein with reference mainly to children, one skilled in the art will recognize that the techniques of the methods and systems of the present invention can be applied to any viewer of content and can be used in other types of situations where viewing habits are of interest or concern. For example, in some environments tailored to providing computer-based activities to those with learning disabilities, increased self-monitoring and rewarding of desired behaviors can be accomplished using a system with similar techniques to a CVCS. In another example, the present invention may be integrated with a payment systems whereby a viewer pays for viewing particular types (or other characteristics) of programs, and a viewing budget is established in line with a financial payment scheme.

FIG. 3 is a block diagram of an example viewing budget. The viewing budget can be created or modified at any time, statically or dynamically, depending upon the particular embodiment using appropriate techniques. Content viewing budget 300 is shown represented as a table of rules ($R_1, R_2, \ldots R_n$), each rule specifying one or more values for descriptors ($D_1, D_2, \ldots D_m$). One skilled in the art will recognize that FIG. 3 is a representation of the content viewing budget data and rules and that any well-known mechanism for storing this or similar information will yield equivalent data structures. For example, arrays, tables in databases with corresponding program code logic (stored in the databases as stored procedures or in external code that retrieves data from the databases), hash tables, records, spreadsheets, etc. may be used. Each rule specifies data values and/or a set of conditions that are evaluated when the budget is reconciled by the CVCS. For example, content viewing budget 300 includes a specification of location (Loc ID) in descriptor $D_1$, a identifier of the viewer (User ID) in descriptor $D_2$, a condition (such as a mathematical expression) that is evaluated to determine time allotment (Time Allotment Condition) in descriptor $D_3$, and a series of content classifier-value pairs (Content Classifier/Value) in descriptor $D_4, \ldots D_m$ that are content and purpose dependent. For example, the content classifiers may related to EPG parameters that can be retrieved from the content using well-known techniques such as program title, show times, channel, story lines, actor's names, genre, rating, etc. In one embodiment, the conditions may be indicated as pattern matching expressions that follow a known or specialized format. Other embodiments may use features of the underlying data structure, such as stored procedures in a database.

For example, rule $R_1$ specifies a rule that is applicable to TVs located in the living room and all users of the system. Rule $R_1$ states that all users can view content rated G or PG, that is not classified in the genre "Action" during the hours of 8:00 p.m.-10:00 p.m. In addition, rule $R_2$, also applicable to the living room, states that on or after 10:00 p.m. any user other than the viewers identified as USER1, USER2, and USER3 can view content on the system. Reconciling these budgetary rules, the CVCS would determine that if USER1 attempts to view content after 10:00 p.m. or attempts to view content rated other than "G" or "PG" or "Action," then an appropriate consequence, such as denying the request, will occur. Although not shown, the viewing budget can be expanded to include a correspondence between appropriate consequences and budget conditions in addition or instead of modifying the user's allotment of viewing time (shown as a time allotment condition in descriptor $D_3$). For example, some conditions may imply that the viewing request is denied, whereas others send notifications, or perform other actions. In addition, different allotment systems may be incorporated such as total time, number of times viewed per time period (e.g., day, week, month, etc.), time viewed per time period, or any other mechanism of tracking and allotment of viewing "points," etc.

In the example shown, rules $R_3$-$R_n$ specify a series of conditions that are applicable to use of the television in the bedroom labeled as bedroom 1 for all users. These rules demonstrate a more carefully crafted budget for molding viewing habits, say for a child, to encourage the viewing of some shows, but not others. Specifically, rule $R_3$ states that if the viewer watches cartoons, then every hour used is charged as two hours thereby using up more budgetary time than actual time elapsed. Rule $R_4$, however, states that if the viewer watches a science or education oriented program (as determined by genre), then every hour used is accounted for as a half hour, thereby using up less budgetary time than actual time elapsed, to hopefully encourage the viewing of such programs. Rule $R_n$, states further that if the viewer not only watches a science program but if the program has the actor "Bill Nye" in it, then each hour viewed is accounted for as 0.25 of an hour. Well-known techniques and heuristics can be used to resolve rules when one or more apply and yield different allotment results, e.g., least time used up wins out. Rule $R_5$, states that, in any case, the viewer is limited to 10 hours per week, thus if a user's time allotment meets this condition, then an appropriate consequence (such as turning off the TV) can be performed. One skilled in the art will recognize that the examples shown in FIG. 3 are only examples, and that many variations and combinations of conditions, classifiers, budgeting units, and consequences can be programmed to manage viewing habits.

Figure 4:
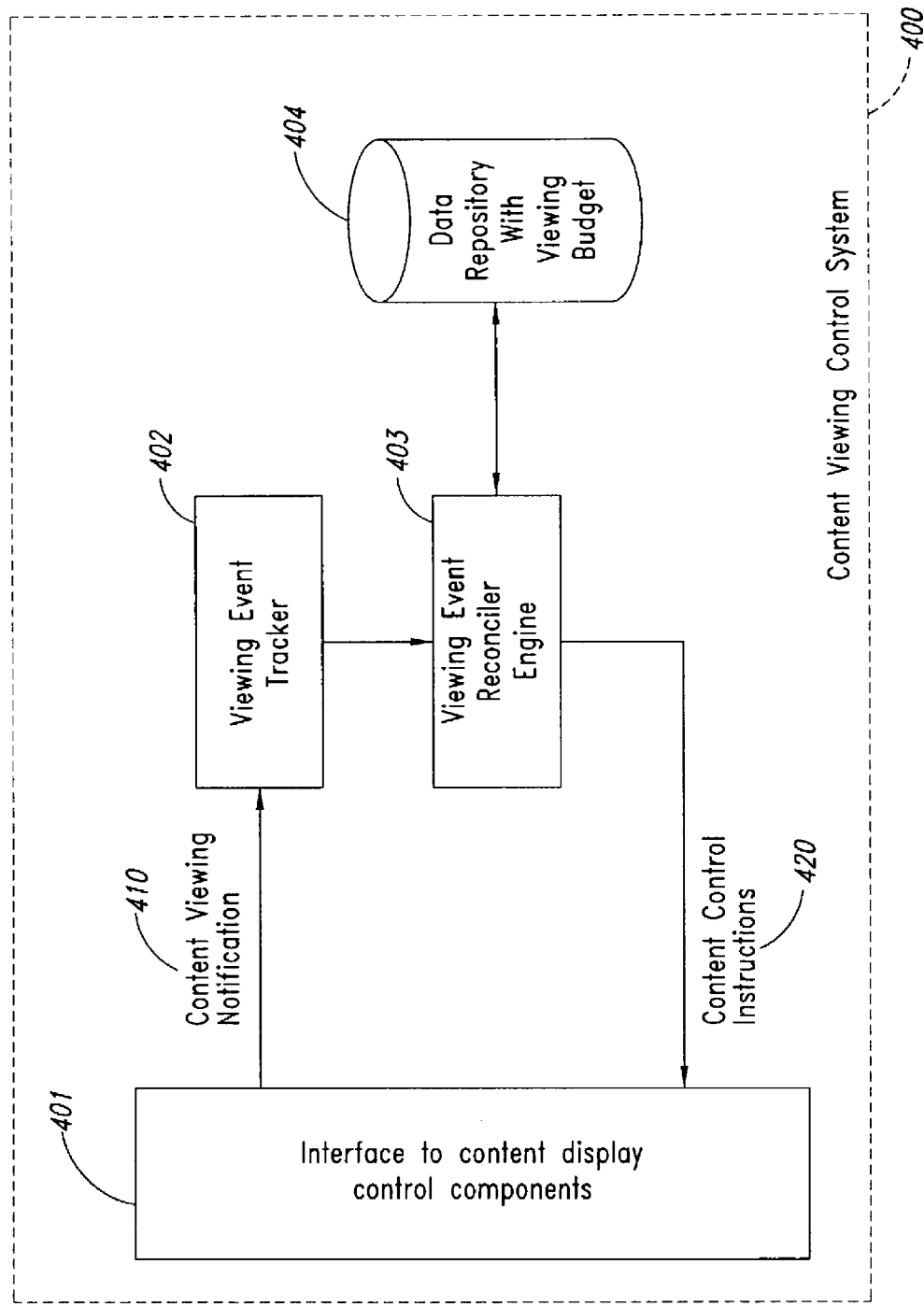
FIG. 4 is an example block diagram of components of an example Content Viewer Control System.

In one example embodiment, the CVCS comprises one or more software modules that track content before it is viewed and manage the viewing of content against a viewing budget. FIG. 4 is an example block diagram of components of an example Content Viewer Control System. Content Viewer Control System 400 comprises an interface 401 to the content display and control components, for example media center or set-top box 110 of FIG. 1; a viewing event tracker component 402; and a viewing event reconciler engine 403. The viewing event tracker 402 receives notification 410 of content to be viewed (a potential viewing event), extracts pertinent information, and forwards the extracted information to the viewing event reconciler engine 403. The viewing event reconciler engine 403 reconciles the forwarded information against budget data and/or rules and sends content control instructions 420 to the interface 401. The CVCS 400 optionally contains a data repository 404 with a viewing budget as shown, or interfaces to an external data repository such as repository 140 shown in FIG. 1. One skilled in the art will recognize that well known techniques for storing and accessing data and rules for interpreting that data are contemplated for use with a CVCS, including hierarchical data base systems that implement structured data with stored procedures.

Figure 5:
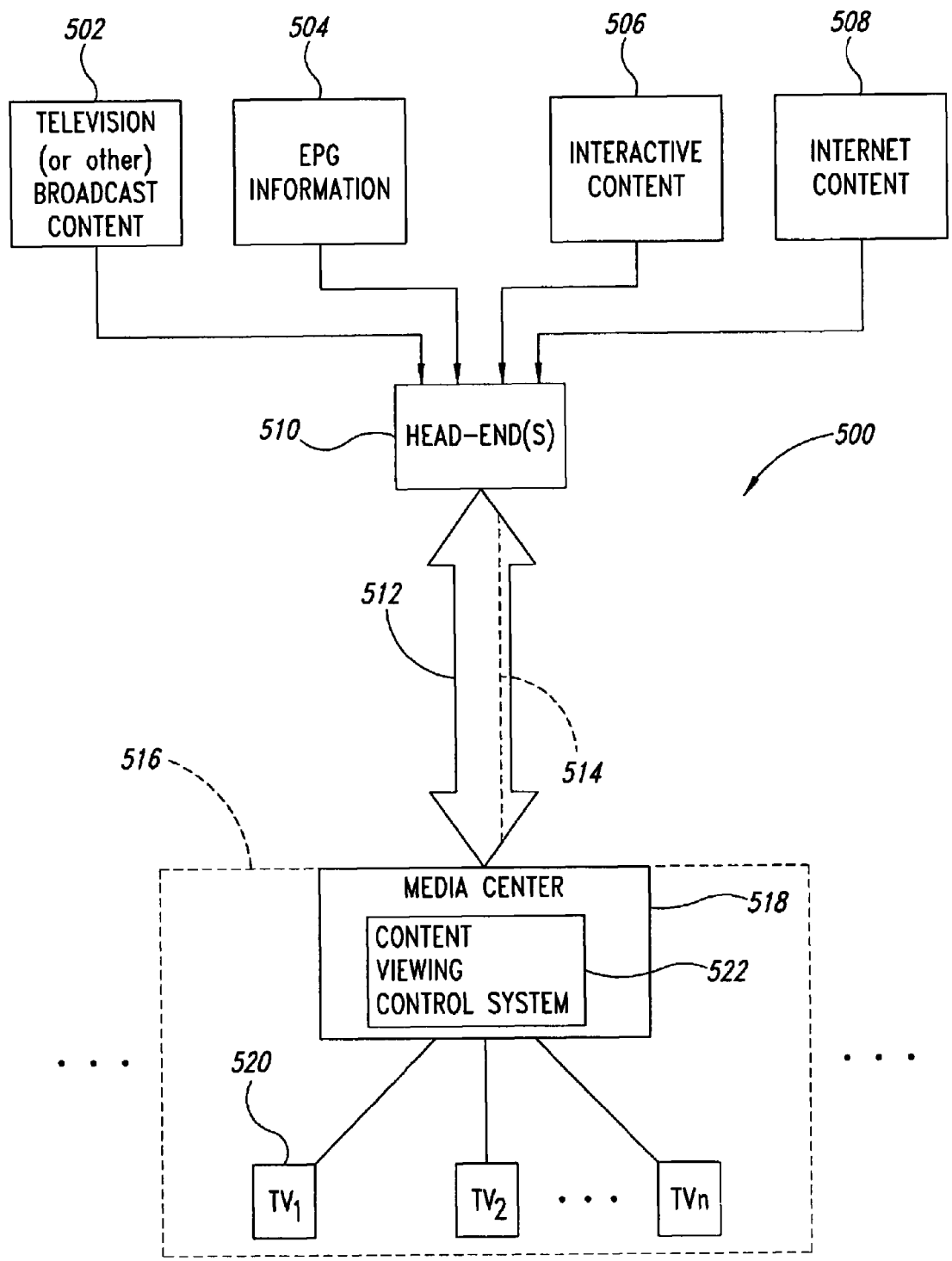
FIG. 5 is an example block diagram of a television environment for practicing embodiments of the Content Viewer Control System.

FIG. 5 is an example block diagram of a television environment for practicing embodiments of the Content Viewer Control System. The television environment 500 includes one or more content sources 502-508 that provide content. For example, the environment 500 includes a television broadcast content source 502 to provide television programs and other video for distribution to viewers. The television broadcast content source 502 may comprise television networks and broadcasters, local or national television studios, production studios, and other known types of video content providers. The environment 500 as shown also includes an electronic programming guide (EPG) information source 504. The EPG information source 504 may be provided by a party such as multiple system operator (MSO), production studio, broadcaster, or other party that typically provides EPG information for downloading to viewer televisions. EPG information may be used by the CVCS, for example, to configure the viewing budget to determine possible genre values to support a genre "characteristic" of the viewing budget. If the environment 500 provides interactive television capabilities to its viewers, then the environment 500 may include one or more interactive content sources 506. For instance, an MSO may operate the interactive content source 506 to provide its viewers with supplemental information that accompanies television broadcasts, interactive content channels, on-line electronic commerce opportunities, and the like. The environment 500 may also include an Internet content source 508, such as servers, web sites, portals, or other mechanism by which viewers may access the Internet via their televisions.

The content sources 502-508 are in turn connected to one or more distribution centers, such as head-ends 510. Each head-end 510 typically services televisions in a particular viewing subscription area, by receiving content from the sources 502-508 and then distributing the content to its subscriber television locations 516. In one embodiment, each head-end 510 distributes its content to subscriber televisions by way of a distribution network 512 in the form of a hybrid fiber coaxial (HFC) cable distribution network. The content distributed via the distribution network 512, such as video programs, may be analog or digital. For instance, content transmitted in digital form can be transmitted via Motion Pictures Expert Group (MPEG) streams.

One skilled in the art will appreciate that the distribution network 512 need not necessarily be limited to hardwire distribution networks. For example, all or parts of the distribution network 512 may comprise optical, satellite, radio frequency, microwave, or other wireless link. Moreover, the distribution network 512 may comprise combinations of both hardwire and wireless links. In one embodiment, the distribution network 512 may include one or more additional communication links 514 that provide meta-information and other programming information to receiving televisions. The communication link 514 may comprise an out-of-band channel, which is a frequency carried by a coaxial cable that is dedicated to sending meta-information. As a person skilled in the art would appreciate, the communication link 514 can be provided via other techniques in some embodiments. These techniques may include, but are not limited to, MPEG streams, analog transmissions, Ethernet or Internet connection, download via telephone lines, and so forth.

One or more viewer "locations" 516 are connected via communication paths to the distribution network 512 to receive the television broadcasts and other content from the head-end 510. For purposes of simplicity of explanation, the viewer location 516 will be described herein in the context of a household having multiple televisions, which may or may not be networked within the household. One skilled in the art will appreciate that the locations 516 can indicate locations in other types of establishments as well, including apartments, schools, hospitals, airport terminals, business campuses and complexes, or other locations where multiple televisions may be envisioned or present.

According to one example embodiment of the invention, the televisions in the location 516 are connected to a home network. For example, a media center (MC) 518 may comprise a type of electronic client terminal (or other device) that is connected to the distribution network 512 to receive the various types of content. One or more televisions 520 (e.g., TV1, TV2, ... TVn) are connected to the media center 518, and the media center 518 distributes content to the televisions 520. As will be described in more detail with respect to FIG. 6, in one embodiment, the media center 518 has various tuners, decoders, other hardware and software, and processor and storage capabilities that allow it to process and distribute content to the televisions 520 that it serves. In addition, media center 518 includes a CVCS 522 for controlling the distribution of content according to techniques of the present invention.

Figure 6:
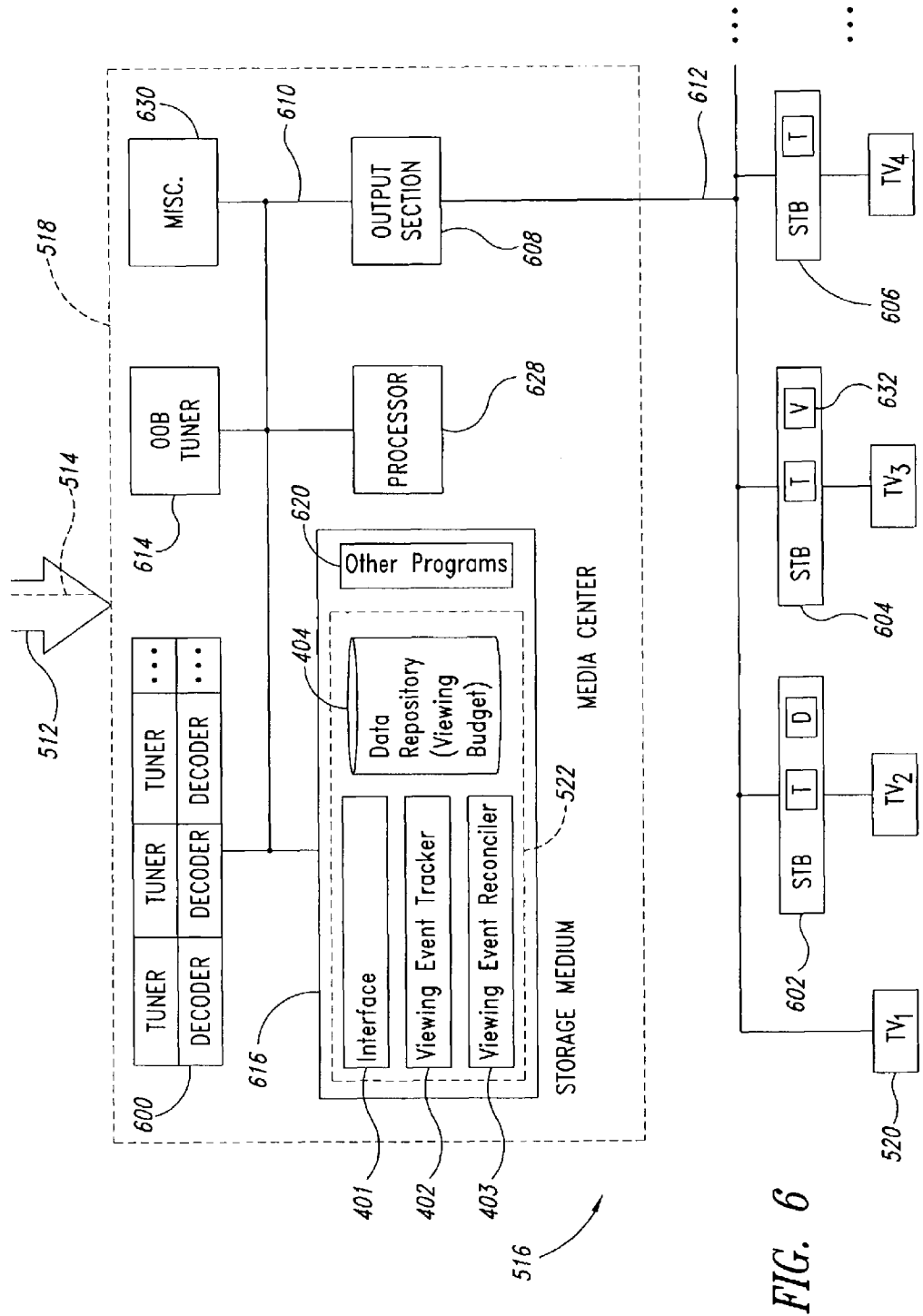
FIG. 6 is an example block diagram of a networked media center embodiment that includes a Content Viewer Control System.

FIG. 6 is an example block diagram of a networked media center embodiment that includes a Content Viewer Control System. FIG. 6 shows in more detail one embodiment of a media center 518 of an environment (e.g., a viewing location 516) in which the CVCS can be implemented. The networked media center 518 may comprise one or more server and/or client computing systems and may span distributed locations. In addition, each block may represent one or more such blocks as appropriate to a specific embodiment or may be combined with other blocks. In addition, the various blocks of the CVCS 518 may physically reside on one or more machines, which use standard interprocess communication mechanisms to communicate with each other. In the embodiment shown, media center 518 comprises a storage medium 616, a plurality of tuners and decoders 600, a processor unit 628, an output (distribution) section 608, a communications interface 614, and other components 630. The components operate together to process and distribute content to televisions 520 optionally through set-top boxes 602-606.

The tuners and decoders 600 of the MC 518 perform tuning and/or decoding for televisions 520 (and their set-top boxes 602-606, if applicable), where one or more of the televisions 520 may have limited or no capability to perform these operations. The MC 518 may also have capability to centrally perform other types of operations for the televisions 520. The plurality of tuners and decoders 600 of the MC 518 may be analog or digital devices, or a suitable combination of both, including MPEG tuners and MPEG decoders to tune to and decode specific audio/video television signals received from the distribution network 512.

The media center 518 is shown distributing output via network link 612 to a plurality of television locations. For purposes of illustration, TV1 may be the "primary" television serviced by the MC 518 (e.g., if the MC 518 is located in the living room, then the MC 518 may operate as the "set-top box" for the living room TV1 to perform tuning and decoding). TV2 connected to set-top box 602 is an example of a television with a set-top box (or built-in set-top box functionality) having its own tuning and decoding capabilities (as illustrated by "T" and "D," respectively). Thus, TV2 does not need to utilize the tuning and decoding capabilities of the media center 518. TV3 has a set-top box 604 with no/limited tuning capabilities but with decoding capabilities, and TV4 has a set-top box 606 with no/limited decoding capabilities but with tuning capabilities. Again, one skilled in the art will appreciate that this is only one sample network architecture, and that other network architectures are possible.

The media center 518 also includes an output section 608, which is connected to the tuners and decoders 600 via a bus 610, and includes multiplexers, ports, addressing circuitry, modulators and demodulators, or other appropriate components to ensure that each of the televisions 520 receives the content that is intended for it. The output section 608 is connected to the televisions 520 via a network link 612, which may be hardwired or wireless.

The media center 518 includes a communication interface 614, such as an out-of-band tuner, to receive information sent via a communication link 514, such as EPG information. The communication interface 614 may comprise other types of interfaces, including interfaces for Ethernet, telephone modem, local area network, or others. The communication interface 614 may receive information as "pushed" data from the head-end 510, or it may "pull" the information from the head-end 510.

Media center 518 also includes one or more machine-readable storage medium(s), such as memory 616, to store components of the MC 518 that are used to store and control the receiving and distribution of content received from the tuners and decoders 600. For example, the CVCS 522 is shown residing in storage medium (e.g., a "memory") 616 and includes an interface 401 to other media center components, a viewing event tracker 402, a viewing event reconciler engine 403, and data repository 404. The components of the CVCS 522 which are typically software applications or other machine-readable instructions or code, preferably execute on the processor 628 and implement functions and behaviors to manage the viewing habits, as described in previous and following figures, by controlling the content delivered to output section 608. Other downloaded code 620 and potentially other data repositories also reside in the memory 616, and preferably execute on one or more processors 628.

One skilled in the art will recognize that the CVCS 522 or media center 518 may be implemented in an integrated or embedded environment, such as embedded in a television system or in a distributed environment that is comprised of multiple, even heterogeneous, computer systems and networks. For example, in one embodiment, the interface 401, the viewing event tracker 402, the viewing event reconciler 403, and the data repository 404 are all located in physically different computer systems. In another embodiment, various components of the CVCS 522 are hosted each on a separate server machine and may be remotely located from the viewing budget tables which are stored in the data repository 404. In one embodiment, the viewing budgets are stored remotely from the MC 518 and accessible by the MC 518 when needed. For example in FIG. 6, the STB 604 for TV3 stores a viewing budget 632 associated with that television. TV3 may be a television for a grandparent's bedroom, for instance, with the viewing budget 632 containing budgeting information that corresponds to that elderly person's viewing habits. Different configurations and locations of programs and data are contemplated for use with techniques of the present invention. In example embodiments, these components may execute concurrently and asynchronously; thus the components may communicate using well-known message passing techniques. One skilled in the art will recognize that equivalent synchronous embodiments are also supported by a CVCS implementation.

The media center 518 may also include miscellaneous components 630, which are not described in detail herein for the sake of brevity. Such miscellaneous components 630 may include a cable modem, a display screen, drivers, multiplexers and demultiplexers, television signal modulators and demodulators, or other components. It is noted that some of the components of the MC 518 may be combined, rather than being separate components, in any one embodiment.

Figure 7:
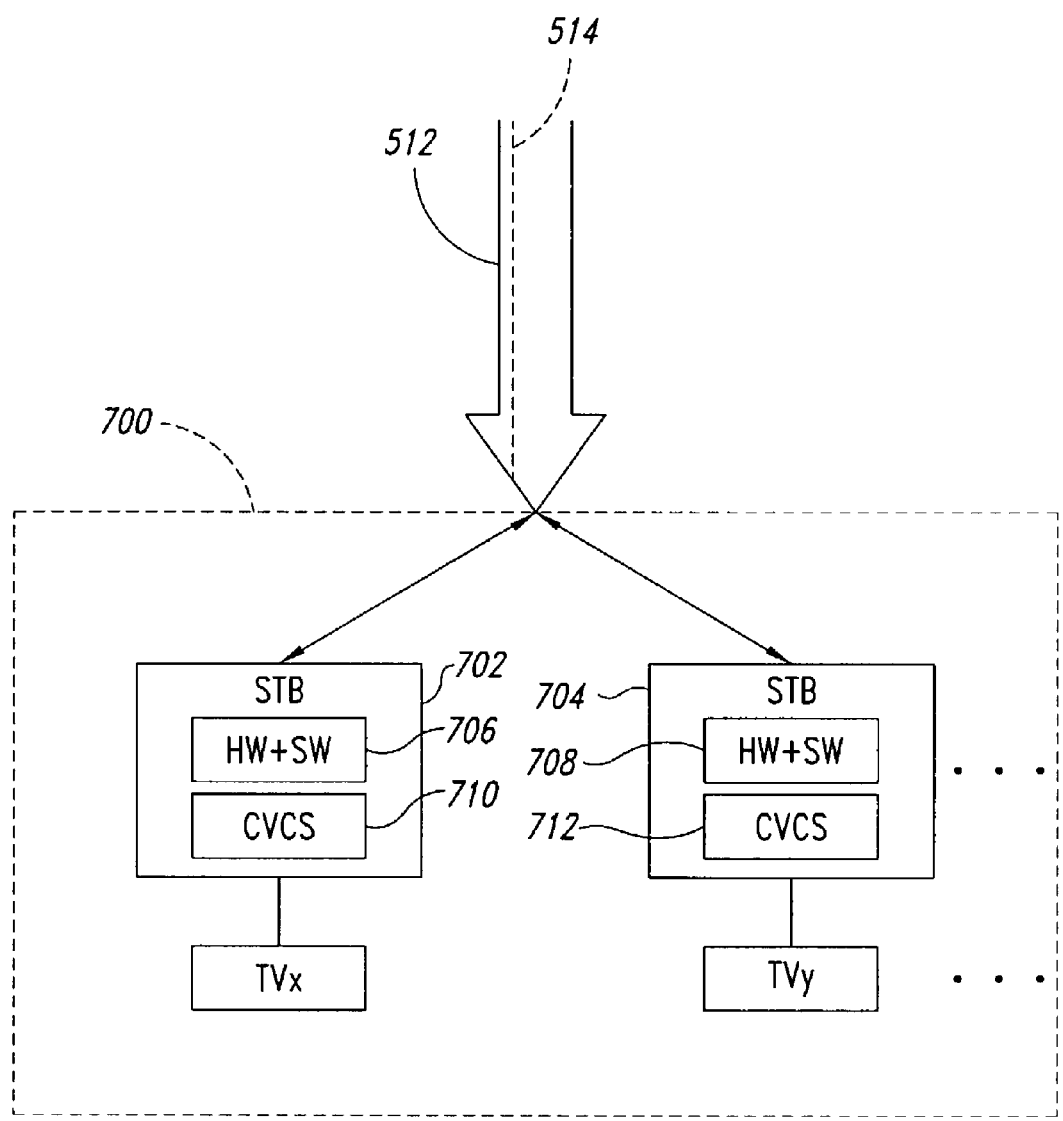
FIG. 7 is an example block diagram of a non-networked embodiment of an environment that includes a Content Viewer Control System.

FIG. 7 is an example block diagram of a non-networked embodiment of an environment that includes a Content Viewer Control System. FIG. 7 shows in more detail another embodiment of a viewing location of an environment 700 in which the CVCS can be implemented. In contrast to the illustrated embodiment of the location 516 of FIG. 5, the location 700 of FIG. 7 includes televisions TVx, TVy, etc. that are not necessarily networked to an MC 518 or other type of internal network. Rather, set-top boxes (STBs) 702 and 704 of TVx and TVy, respectively, are shown as directly and separately coupled to the distribution network 512 to receive television programming therefrom. Each STB 702 and 704 has its own separate hardware and software 706 and 708, respectively, similar to the components illustrated in FIG. 6 for the MC 518, to process received television signals and viewing information. Thus, as each MC 518 also includes a partial or full implementation of a CVCS, each STB shown here includes separate instances of a CVCS 710 and 712.

One skilled in the art will recognize that this architecture may be implemented in varying degrees of a standalone implementation of a CVCS to a distributed CVCS, where only a very thin client application runs as the CVCS portions stored in set-top boxes 702 and 704. According to this architecture, the bulk of the event tracking and budget reconciliation is handled by a CVCS server system, for example, located at a head-end, such as head-end 510 of FIG. 5. The CVCS server system would then communicate with each client CVCS system to implement the techniques of the present invention.

In addition, one skilled in the art will also recognize that the CVCS components (and other components equivalent to those of a media center) may be embedded into a television or other similar content displaying device.

There are several implementation approaches to the components of the CVCS, only a subset of which are described herein. One skilled in the art will recognize that various other approaches and combinations are possible, including a client-server distributed implementation as mentioned. Also, one skilled in the art will also appreciate that standard programming techniques may be used to handle behaviors such as retrieving and updating a content viewing budget in, for example, a database and such as storing and updating a content viewing budget entry or configuration data such as user and location information etc. For example, a configuration data file that stores identification for each user and for each display (e.g., TV) can be stored as standalone information or integrated into the content viewing budget information. In addition, a user interface for configuring the content viewing budget, such as for parental use, is also preferably made available using well-known technologies.

Figure 8:
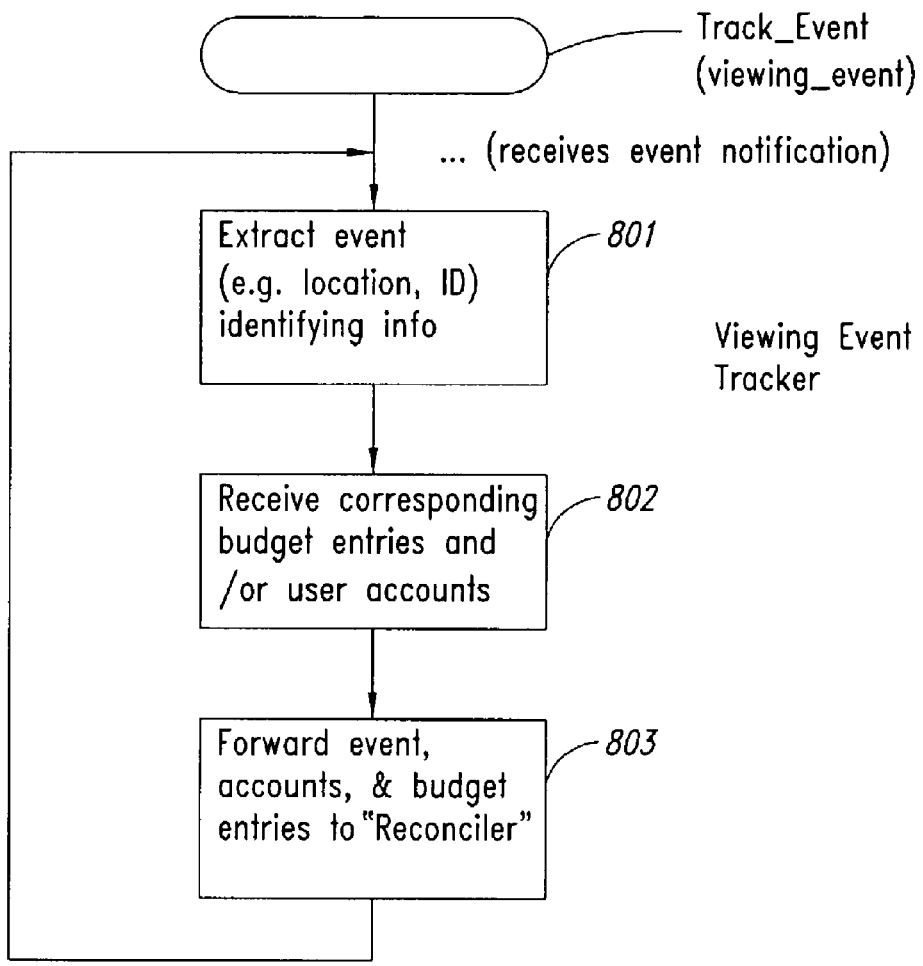
FIG. 8 is an example flow diagram of an example viewing event tracking routine provided by a viewing event tracker to track viewing events for a designated device or viewer.

FIG. 8 is an example flow diagram of an example viewing event tracking routine provided by a viewing event tracker to track viewing events for a designated device or viewer. In step 801, the track_event routine, after being invoked as a result of receiving a potential viewing event, extracts information that identifies relevant portions of the event to be potentially displayed. Depending upon the configuration of the CVCS relative to the remainder of the viewing system(s), a viewing event tracker may handle events for all viewing systems or for a designated device; thus the steps executed are somewhat dependent upon the configuration. If the tracker handles only events for a designated device, then the logic of viewing event tracking routine is simplified as it only concerns budget entries for a single device (but potentially a multitude of viewers). For example, the routine may only need to extract user identifying information if it is known a priori to which device the event applies. Specifically, in step 802, the routine retrieves the budget entries and any relevant account information that correspond to the device location and/or user, and in step 803 forwards this information to the viewing event reconciler engine for budget reconciliation.

Figure 9:
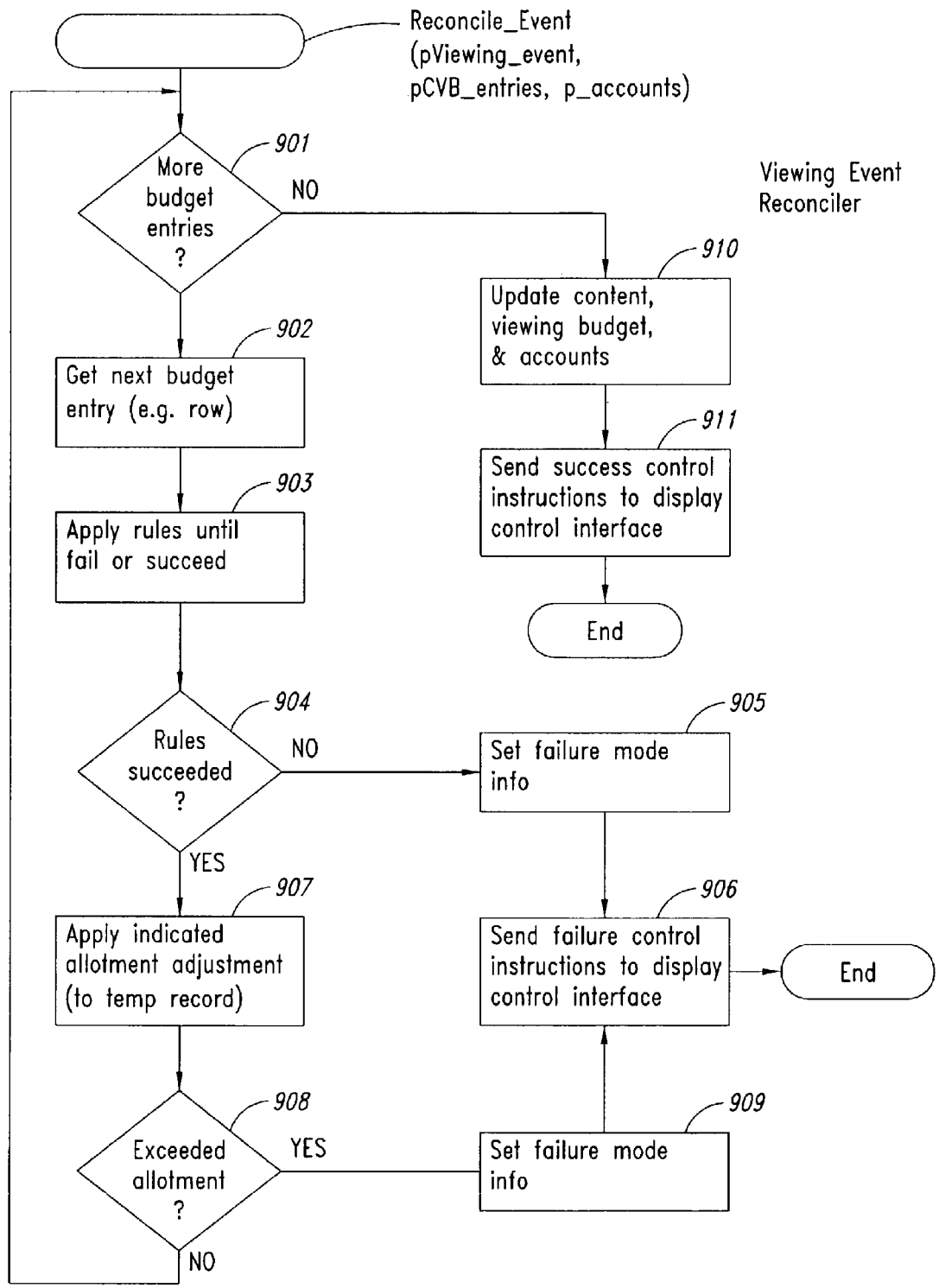
FIG. 9 is an example flow diagram of an example budget reconciliation routine provided by a viewing event reconciler engine to dynamically monitor and control content viewing.

FIG. 9 is an example flow diagram of an example budget reconciliation routine provided by a viewing event reconciler engine to dynamically monitor and control content viewing. Again, depending upon the specific configuration currently in operation and the organization of the viewing content budget and accounting data, the specifics of this routine may vary substantially. In the example illustrated, it is assuming that the budgeting data is stored in a structure similar to that shown in FIG. 3 (e.g., with rows of "business" rules that correspond to conditions that must be met) and that the accounting data is stored on a per user per device basis (e.g., as a running total). In summary, the reconciliation routine takes as input parameters an indication of a potential viewing event, an indication of content viewing budget entries (as determined by the tracker to be appropriate to the potential viewing event), and an indication of accounts. The routine examines each budget entry relating to the received potential viewing event and, when applicable, tests the conditions present in each entry against the budget allotment remaining to determine whether the designated user and device combination is permitted to view the designated viewing event.

More specifically, steps 901 though 908 loop over each related budget entry and test each condition. The loop exits when a rule fails, the user's account indicates that the budget (e.g., time) allotment is exceeded, or the conditions were successful and the user is able to view the event. In step 901, the routine determines whether there are more budget entries (e.g., rows) to process and, if so, continues in step 902, else continues in step 910. In step 902, the routine obtains the next budget entry. In step 903, the routine applies all of the rules (i.e., tests the conditions) until any one of them fails or all have been applied successfully. For example, in Row $R_1$ of FIG. 3, rules $D_3$, $D_4$ and $D_5$ indicate that between the hours of 8 p.m. and 10 p.m. any user can watch (limited by time allotment) content whose genre specification is not classified as "Action" and content that is rated "G" or "PG." In step 904, if the rules indicate success thus far, then the routine continues in 907, else continues in step 905. In step 905, a failure mode is set so that the user can be appropriately notified and the routine continues in step 906. In step 906, the routine sends control instructions to the display control interface (e.g., interface 401 in FIG. 4) to indicate that analysis of the potential viewing event is restricted, so that the content display control components (such as a media center) can control (or prevent) distribution of the content or initiate other system specific consequences (e.g., turn off the T.V. automatically), and then returns. In step 907, when the routine has determined that the conditions thus far have been met successfully, the routine (temporarily) adjusts the account record for that user-device combination (appropriate to how the accounting is set up). As part of this process, the routine also determines whether there is any allotment adjustment to be used when the user's account is reconciled to "pay" for the viewing event and applies any such adjustment. For example, in budget entry $R_3$ of FIG. 3, the rule $D_3$ indicates that each hour of content that is classified as a cartoon uses double the actual viewing time indicated in the designated viewing event (e.g., parameter "pviewing_event"). Thus, if the designated viewing event indicates that the event duration is 1 hour, then the user's account will be "charged" for 2 hours. Preferably, a temporary accounting mechanism is used, because other budget entries may yet indicate that the user is restricted from viewing the designated viewing event. In step 908, if the user's account indicates that the user's time allotment (for that kind of event, however measured or tracked) has been exceeded, then the routine continues in step 909, else routines to the beginning of the loop in step 901. In step 909, a failure mode is set so that the user can be appropriately notified that the budget was exceeded, and in step 906, the routine sends control instructions to the display control interface to indicate that analysis of the potential viewing event failed in the indicated failure mode, and then returns. In step 910, once the routine has determined that all related budget entries have been evaluated, then the routine updates the (previously temporary) changes to the user's account (and viewing budget if appropriate). The routine then in step 911 sends control instructions to the display control interface to indicate that the event may be viewed, and then returns.

All of the above U.S. patents, U.S. patent application publications, U.S. patent applications, foreign patents, foreign patent applications and non-patent publications referred to in this specification and/or listed in the Application Data Sheet, including but not limited to U.S. patent application Ser. No. 10/260,701, entitled "Method and System for Electronic Program Guide (EPG) Personalization in a Multi-Television, Multi-Tuner environment," filed Sep. 30, 2002, are incorporated herein by reference, in their entirety.

From the foregoing it will be appreciated that, although specific embodiments of the invention have been described herein for purposes of illustration, various modifications may be made without deviating from the spirit and scope of the invention. For example, one skilled in the art will recognize that the methods and systems for discussed herein are applicable to other types of tracking other than for monitoring the viewing of content to control such viewing. For example, one skilled in the art will also recognize that the methods and systems discussed herein are applicable to tracking viewing of any type of interactive application for use, for example, for generating "Nielsen" type rating data or other types of tracking data. In addition, the methods and systems discussed herein are applicable to differing protocols, communication media (optical, wireless, cable, etc.), and other devices, such as wired or wireless devices, personal computers, wireless handsets, electronic organizers, personal digital assistants, portable email machines, game machines, pagers, navigation devices such as GPS receivers, and embedded computing systems, etc.

What is claimed is:

1. A method for managing content viewing on a display in a television environment, comprising:
   receiving at a set top box an indication of values that correspond to a plurality of viewing budget parameters for program content available for viewing, the parameters including a time length of the content and a genre of the program content available for viewing, the indication of values being received from a headend device;
   receiving at the set top box budget allotment conditions including a restriction on access to content based on the genre of the content and a time allotment for the genre of the program content available for viewing;
   storing at the set top box the received viewing budget parameter values for use in offsetting against a viewing budget for a display device; and
   upon receiving an indication at the set top box that a selected content is requested for viewing on the display device, wherein the selected content is a program for presenting on a television,
      tracking data associated with the selected content including a time length of the selected content and a genre of the selected content;
      reconciling the selected content against the viewing budget by subtracting one or more of the viewing budget parameters associated with the selected content from one or more of the budget allotment conditions; and
      denying viewing of the selected content if access to the selected content is restricted if a time length for the genre of the selected content does not fit within the time allotment specified by the budget allotment condition.

2. The method of claim 1, further comprising:
   upon reconciling the viewing budget against the selected content, controlling the content to be sent to the display by denying viewing of the selected content if the time length of the content exceeds a remaining amount of the time allotment.

3. The method of claim 2 wherein controlling the content comprises preventing the selected content from being sent to the display so that the selected content is no longer viewable.

4. The method of claim 2 wherein controlling the content comprises sending a message to the display.

5. The method of claim 1, further comprising:

upon reconciling the viewing budget against the selected content, modifying a value of a budget parameter of the viewing budget that is associated with the designated content.

6. The method of claim 5 wherein the modified budget parameter indicates viewing time that is allotted to the selected content.

7. The method of claim 5 wherein the budget parameter value is modified to indicate an increase in viewing time allotted to the selected content.

8. The method of claim 5 wherein the budget parameter value is modified to indicate a decrease in viewing time allotted to the selected content.

9. The method of claim 5 wherein the budget parameter that is modified identifies a viewer that is authorized to view the selected content.

10. The method of claim 5 wherein the budget parameter that is modified identifies a location that is authorized to view the selected content.

11. The method of claim 1, the viewing budget parameters including an indication of a rating associated with the content and the at least one budget allotment condition includes a restriction on access to content based on the rating of the content, the method further comprising:
    tracking data associated with the selected content including rating of the selected content;
    reconciling selected content against the viewing budget using the at least one budget allotment condition restricting access to content based on the rating of the content; and
    denying viewing of the designated content if access to the selected content is restricted based on the rating of the selected content.

12. The method of claim 1 wherein the viewing budget parameters further include at least one of an identifier of an actor or a content author.

13. The method of claim 1 wherein at least a portion of the tracked data is determined from an electronic programming guide.

14. The method of claim 1 wherein at least a portion of the tracked data is determined by dynamically tracking viewing in the television environment.

15. The method of claim 1 wherein the display is part of a media center network.

16. The method of claim 1 wherein the display is a television screen connected via a set-top box.

17. The method of claim 1 wherein the content is at least one of a live analog broadcast, a live digital broadcast, streamed data, and playback of pre-recorded data.

18. The method of claim 1, the tracked data including an indication of time associated with the viewing event, and further comprising:
    reporting the indication of time associated with the viewing event to an external system.

19. The method of claim 18 wherein the external system collects Nielson rating data.

20. The method of claim 1, the viewing budget parameters including an indication of broadcast time associated with the content and the at least one budget allotment condition includes a restriction on access to content based on the broadcast time of the content, the method further comprising:
    tracking data associated with the designated content including broadcast time of the designated content;
    reconciling designated content against the viewing budget using the at least one budget allotment condition restricting access to content based on the broadcast time of the content; and
    denying viewing of the designated content if access to the designated content is restricted based on the broadcast time of the designated content.

21. The method of claim 1, the viewing budget parameters including an indication of broadcast channel associated with the content and the at least one budget allotment condition includes a restriction on access to content based on the broadcast channel of the content, the method further comprising:
    tracking data associated with the designated content including broadcast channel of the designated content;
    reconciling designated content against the viewing budget using the at least one budget allotment condition restricting access to content based on the broadcast channel of the content; and
    denying viewing of the designated content if access to the designated content is restricted based on the broadcast channel of the designated content.

22. The method of claim 1, wherein the at least one budget allotment condition further comprises a first budget allotment condition that designates a first time multiplier, which is a number other than one, associated with a first specified genre, and
    wherein reconciling the designated content against the viewing budget comprises multiplying the time length of the designated content by the first time multiplier, when the genre of the designated content is the first specified genre, to provide a chargeable time length of the designated content and charging the chargeable time length for the designated content against the viewing budget.

23. The method of claim 22, wherein the first time multiplier is greater than one.

24. The method of claim 23, wherein the first specified genre is cartoons.

25. The method of claim 22, wherein the first time multiplier is less than one.

26. The method of claim 25, wherein the first specified genre is education oriented programs.

27. A computer-readable memory medium containing instructions for controlling a computer processor to manage content viewing on a display in a television environment, by:
    receiving values for a plurality of viewing budget parameters for television programming content available for viewing, the parameters including a content identifier and a genre of the content;
    receiving budget allotment conditions including a restriction on access to television programming content available for viewing based on the genre of the television programming content available for viewing and a time allotment for the genre of television programming content available for viewing;
    storing the budget parameter values for use in offsetting against a viewing budget described by the budget allotment conditions; and
    upon receiving an indication that a designated content is requested for viewing on the display, wherein the designated content is a program for presenting on a television,
        tracking, as a viewing event, data associated with the designated content including a content identifier, a time length of the designated content, and a genre of the designated content;
        reconciling the designated content against the viewing budget using the plurality of viewing budget parameters associated with the designated content; and
        denying viewing of the designated content if access to the designated content is restricted based on the viewing budget parameters associated with the genre of the designated content.

28. The computer-readable memory medium of claim 27, the instructions further controlling the computer processor by:
  upon reconciling the viewing budget against the designated content, controlling the content to be sent to the display.

29. The computer-readable memory medium of claim 28 wherein controlling the content comprises preventing the designated content from being sent to the display so that the designated content is no longer viewable.

30. The computer-readable memory medium of claim 28 wherein controlling the content comprises sending a message to the display.

31. The computer-readable memory medium of claim 27, the instructions further controlling the computer processor by:
  upon reconciling the viewing budget against the designated content, modifying a value of a budget parameter of the viewing budget that is associated with the designated content.

32. The computer-readable memory medium of claim 31 wherein the modified budget parameter indicates allotted viewing time.

33. The computer-readable memory medium of claim 31 wherein the budget parameter value is modified to indicate an increase in viewing time allotted to the designated content.

34. The computer-readable memory medium of claim 31 wherein the budget parameter value is modified to indicate a decrease in viewing time allotted to the designated content.

35. The computer-readable memory medium of claim 31 wherein the budget parameter that is modified identifies a viewer that is authorized to view the designated content.

36. The computer-readable memory medium of claim 31 wherein the budget parameter that is modified identifies a location that is authorized to view the designated content.

37. The computer-readable memory medium of claim 27 wherein the reconciling further comprises:
  retrieving from the stored viewing budget the budget allotment for the budget parameter values that correspond to the designated content; and
  based upon the retrieved values, determining a relationship between the retrieved time allotment value and an indication of viewing time associated with the designated content.

38. The computer-readable memory medium of claim 37, further comprising controlling the content viewing based upon the determined relationship.

39. The computer-readable memory medium of claim 37 wherein the determined relationship indicates that the retrieved time allotment value is satisfied by the indication of time of the designated content.

40. The computer-readable memory medium of claim 37 wherein the determined relationship indicates that a time allotment is available to view the designated content.

41. The computer-readable memory medium of claim 37 wherein the determined relationship indicates that a time allotment is no longer available for viewing the designated content.

42. The computer-readable memory medium of claim 27 wherein the viewing budget parameters further comprise at least one of an identification of a viewer and an identification of a location.

43. The computer-readable memory medium of claim 27 wherein the content identifier comprises at least one of an indication of a content title, a content genre, a content rating, an identifier of an actor, a content author, an indication of time to be broadcast, or an indication of a broadcast channel.

44. The computer-readable memory medium of claim 27 wherein the received budget parameter values are determined from an electronic programming guide.

45. The computer-readable memory medium of claim 27 wherein the received budget parameter values are determined by dynamically tracking viewing in the television environment.

46. The computer-readable memory medium of claim 27 wherein the display is part of a media center network.

47. The computer-readable memory medium of claim 27 wherein the display is a television screen connected via a set-top box.

48. The computer-readable memory medium of claim 27 wherein the content is at least one of a live analog broadcast, a live digital broadcast, streamed data, and playback of prerecorded data.

49. The computer-readable memory medium of claim 27, the tracked data including an indication of time associated with the viewing event, and further comprising: reporting the indication of time associated with the viewing event to an external system as a Nielsen rating.

50. A content viewing management system in a television environment, comprising:
  a content viewing budget for local management of the viewing of television content by at least one member in a household, wherein the content viewing budget is stored in a data repository and having a budget parameter value and a budgeting condition that relates to a content identifier, wherein the content identifier is based, at least in part, on genre of television content associated with the content identifier, wherein the content viewing budget is modifiable by at least one member of the household and the content viewing budget specifies at least one amount of time for viewing a selected genre of television content, the content viewing budget comprising a plurality of viewing budget entries for a household, each viewing budget entry being associated with at least one of a viewer in the household and a location in the household and each viewing budget entry being associated with a different viewer or a different location than all other viewing budget entries;
  an event tracker that is structured to receive an indication that a designated content has been sent to the display for viewing, wherein the designated content is a program for presenting on a television; to track data associated with the designated content including a content identifier; and to forward the tracked data; and
  an event reconciler that is structured to receive the forwarded tracked data; and, based upon a match of the content identifier of the tracked data to the content identifier of the content viewing budget, to evaluate the budgeting condition to determine a budget disposition; and to reconcile the tracked data by adjusting the budget parameter value as indicated by the budget disposition.

51. The system of claim 50, the event reconciler further structured to control the content to be sent to the display based upon outcome of the reconciliation.

52. The system of claim 51 wherein the control prevents the designated content from being sent to the display so that the designated content is no longer viewable.

53. The system of claim 51 wherein the control sends a message to the display.

54. The system of claim 50 the event reconciler further structured to modify the budget parameter value.

55. The system of claim 54 wherein the modified budget parameter value indicates allotted viewing time.

56. The system of claim 55 wherein the allotted viewing time is increased.

57. The system of claim 55 wherein the allotted viewing time is decreased.

58. The system of claim 54 wherein the modified budget parameter value identifies a viewer that is authorized to view the designated content.

59. The system of claim 54 wherein the modified budget parameter value identifies a location that is authorized to view the designated content.

60. The system of claim 50 wherein budget disposition indicates that a time allotment is available to view the designated content.

61. The system of claim 50 wherein budget disposition indicates that a time allotment is no longer available for viewing the designated content.

62. The system of claim 50 wherein the viewing budget parameter value comprises at least one of an identification of a viewer and an identification of a location.

63. The system of claim 50 wherein the content identifier associated with the content viewing budget comprises at least one of an indication of a content title, a content genre, a content rating, an identifier of an actor, a content author, an indication of time to be broadcast, or an indication of a broadcast channel.

64. The system of claim 50 wherein the viewing budget parameter value is determined from an electronic programming guide.

65. The system of claim 50 wherein the viewing budget parameter value is determined by dynamically tracking viewing in the television environment.

66. The system of claim 50 wherein the environment is a media center network.

67. The system of claim 50 wherein the environment is a set-top box.

68. The system of claim 50 wherein the content is at least one of a live analog broadcast, a live digital broadcast, streamed data, and playback of pre-recorded data.

69. The system of claim 50, the tracked data including an indication of time associated with the viewing event, and further comprising:

reporting the indication of time associated with the viewing event as a Nielsen rating.

70. A content viewing management system in a television environment, comprising:

means for storing a content viewing budget having a plurality of budget parameter values for content for viewing and at least one budgeting condition, wherein the budget parameter values include a plurality of genres of available content a time allotment for each of the plurality of genres of content and the at least one budget allotment condition includes a restriction on access to content based on the genre of the content and the time allotment associated with that genre of the content;

means for receiving an indication that a designated content has been sent to the display for viewing, wherein the designated content is a program for presenting on a television; tracking data associated with the designated content including a content identifier, a viewing time of the designated content, and a genre of the designated content; and forwarding the tracked data;

means for reconciling the designated content against the viewing budget based upon the at least one budget allotment condition; and means for denying viewing of the designated content if access to the designated content is restricted based on the genre of the designated content and the time allotment associated with the genre.

* * * * *